Figure 2:
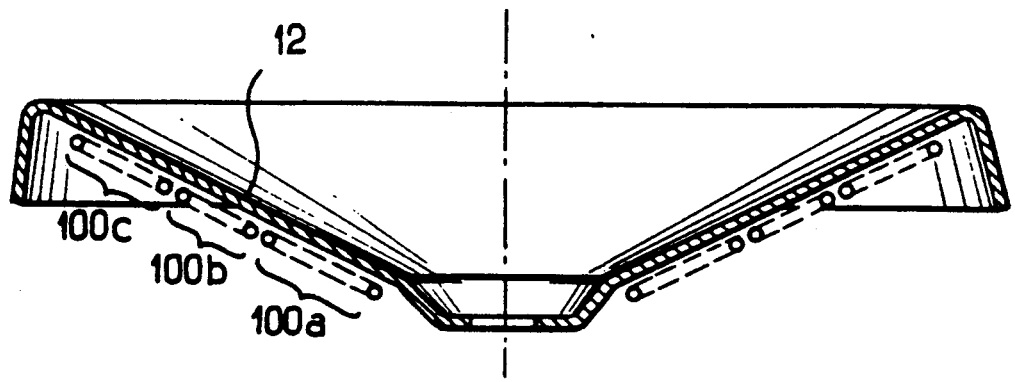

United States Patent

Nuns et al.

[11] Patent Number: 5,334,290
[45] Date of Patent: Aug. 2, 1994

[54] MOLECULAR DISTILLATION APPARATUS HAVING INDUCTION-HEATING

[75] Inventors: Jacques Nuns; Alain Girault, both of Ecuelles; Alain Rancurel, Leves, all of France

[73] Assignee: Expanchimie S.A.R.L., Courbevoie, France

[21] Appl. No.: 792,859

[22] Filed: Nov. 21, 1991

[30] Foreign Application Priority Data

Nov. 21, 1990 [FR] France .................. 90 14518

[51] Int. Cl.⁵ .............................................. B01D 3/12
[52] U.S. Cl. .................................. 202/205; 202/236; 202/238; 202/267.1; 159/6.1; 159/DIG. 15; 159/DIG. 16; 159/DIG. 26; 203/86; 203/100
[58] Field of Search ............... 202/236, 205, 267.1, 202/238; 203/100, 89, 86; 159/6.1–6.3, DIG. 26, DIG. 21, DIG. 15, DIG. 16

[56] References Cited

U.S. PATENT DOCUMENTS

| | | | |
|---|---|---|---|
| 2,313,175 | 3/1943 | Scott et al. | 203/100 |
| 2,523,042 | 9/1950 | McLean et al. | 202/236 |
| 2,538,967 | 1/1951 | Hickman | 203/100 |
| 2,566,274 | 8/1951 | White et al. | 203/100 |
| 2,614,973 | 10/1952 | Burrows | 159/6.1 |
| 3,304,990 | 2/1967 | Ontko et al. | 159/6.1 |
| 3,388,230 | 6/1968 | Cunningham et al. | 159/DIG. 26 |

FOREIGN PATENT DOCUMENTS 62-273003 11/1987 Japan .

Primary Examiner—Wilbur Bascomb, Jr.
Attorney, Agent, or Firm—Stevens, Davis, Miller & Mosher

[57] ABSTRACT

The invention relates to a molecular distillation apparatus of the type comprising a metallic conical rotor (12) rotatably driven and fed in its center with a liquid to be distilled, a vacuum bell (10) defining an enclosure housing the cone and means for inductively heating the rotor which are located beneath and in proximity to the latter.

According to the invention, the heating means comprise at least two concentric inductors (100a, 100b, 100c) supplying different thermal power densities to homologous regions of the rotor and an inner inductor (100a) supplies a greater thermal power density to the rotor than the power density supplied to the rotor by an outer inductor (100c).

The invention also relates to a process for manufacturing an assembly of a rotor and inductors for such an apparatus.

10 Claims, 4 Drawing Sheets

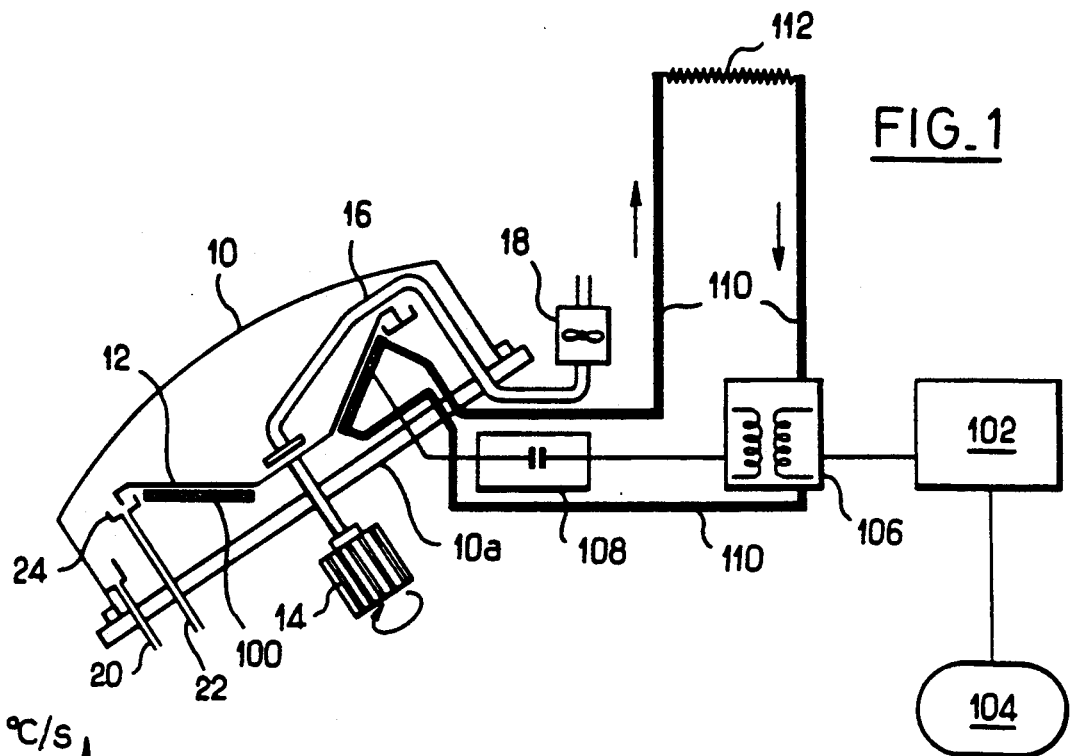
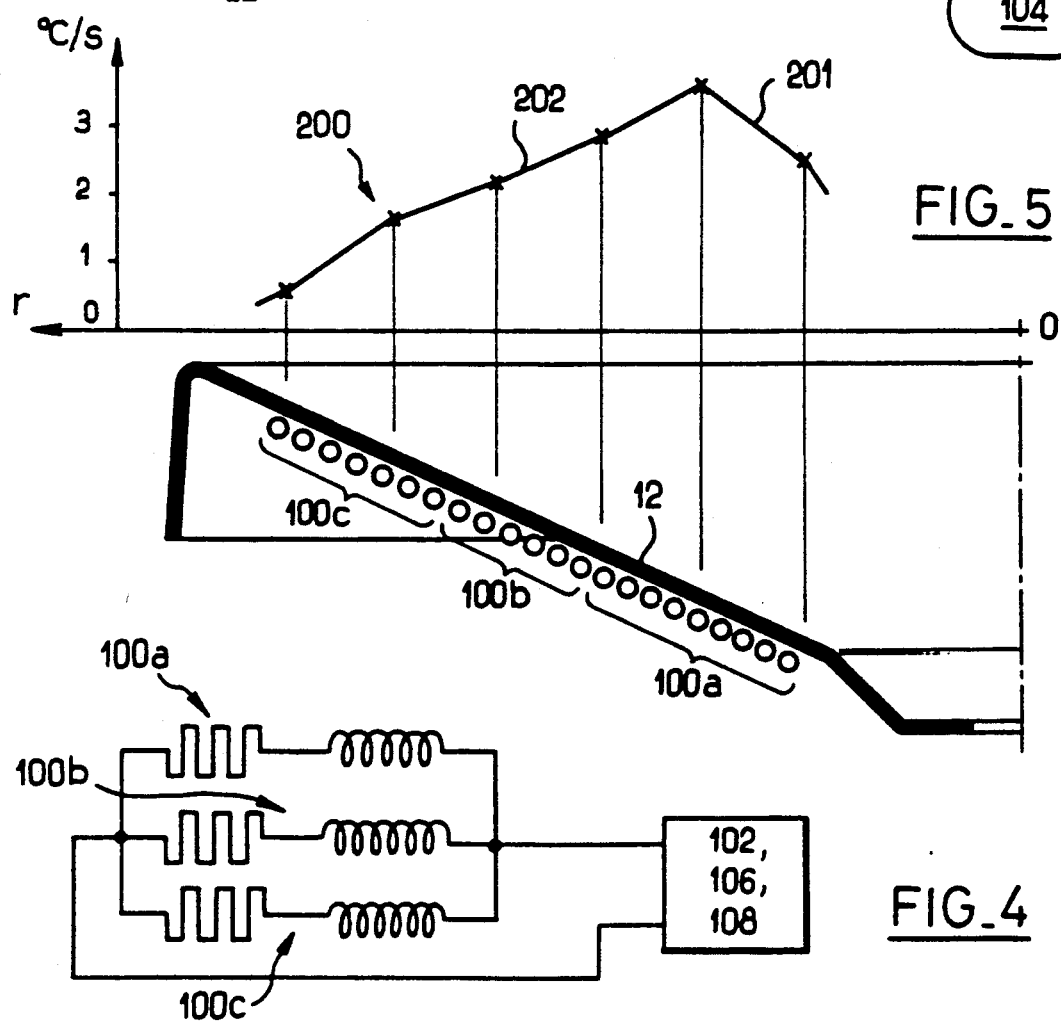

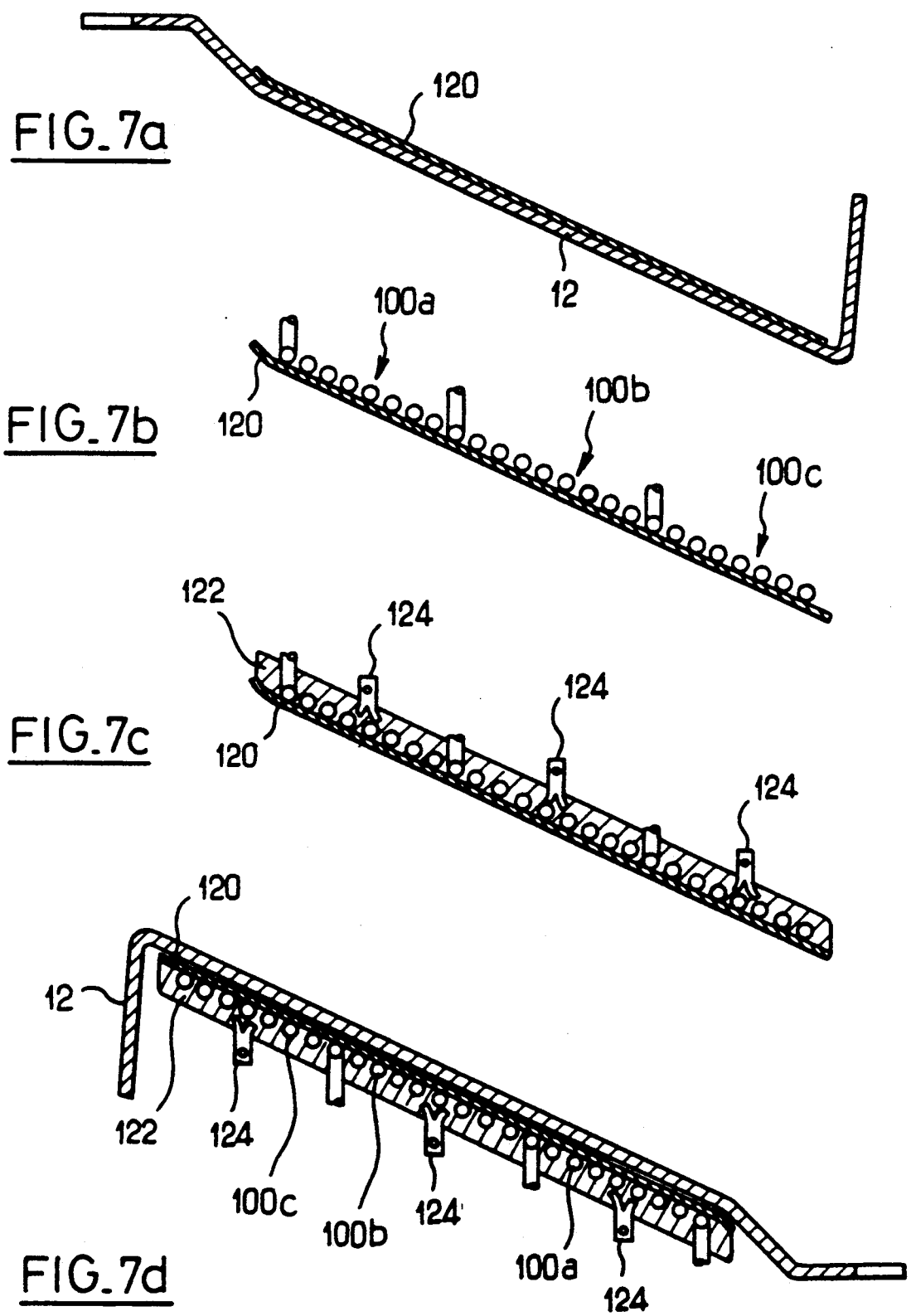

MOLECULAR DISTILLATION APPARATUS HAVING INDUCTION-HEATING

The present invention relates in a general manner to a molecular distillation apparatus and a process for manufacturing a conical rotor/heating device assembly for such an apparatus.

There is already known, by the first publication of Japanese Patent Application No. 62-273,003, a molecular distillation apparatus which is equipped with an induction-heating device. More precisely, a conical spiral winding is provided beneath the conical distillation rotor and is fed by an appropriate generator in such a manner as to inductively heat the cone.

Such a known technique is beneficial as it makes it possible to overcome problems, in older apparatuses, related to Joule-effect heating with the aid of resistance elements radiating in the direction of the rotor.

However, this known induction heating apparatus has numerous drawbacks in practical use.

First of all, in this apparatus there is observed an excessively slow heating of the liquid to be distilled as it begins to spread out over the rotating cone from its center under the action of centrifugal force, while, on the contrary, the liquid is excessively heated in the region of the edges of the cone. In fact, the liquid to be distilled arrives at the center of the cone in a cold state or only slightly heated and the supply of thermal energy is insufficient to bring it rapidly to the distillation temperature. Furthermore, the thickness of the liquid film on the cone substantially diminishes from the center out towards the edges of the cone. This phenomenon is the result, on the one hand, of the increase in the surface and of the centrifugal force applied to the film as the distance from the center increases and, on the other hand, of the reduction in the quantity of liquid material caused by evaporation of the volatile fraction.

Thus, with the known apparatus, the supply of thermal power is excessive in the peripheral region of the cone, with the result that the liquid may be brought to too high a temperature, resulting in a deterioration in its qualities.

These phenomena are explained by the fact that a single spiral inductor, such as described in the above-mentioned patent application, applies an essentially constant power density to the conical rotor from the center out towards the edges.

Moreover, this known apparatus has other drawbacks. First of all, given that a thermally insulating layer is necessarily interposed between the spiral-type inductor and the cone, there exists as a result a significant distance between both these latter elements, typically from 5 to 20 mm, so that the efficiency of the heating system is extremely low. Furthermore, given that the metallic conductor constituting the inductor is directly exposed to the vapors which are released from the distillation cone (these vapors being able to circumvent the insulation apparently without hindrance), the result may be corrosion of the conductor, limiting its lifetime, and a possible contamination of the distillate in the vapor state by traces of the metal of the conductor, which is to be avoided in the majority of applications. In fact such a contamination may lead to a greater susceptibility of the product to oxidation (catalytic effect) and/or a toxicity of this product especially in the case of application of the apparatus to edible or pharmaceutical substances.

The object of the present invention is to overcome these drawbacks of the prior art.

More precisely, the object of the invention is in the first place to propose a new induction-heating device which makes it possible, with the aid of simple and economic means, to apply to the cone a thermal power density which is different at the center of the rotor and in the region of its edges.

For this purpose, there is proposed a molecular distillation apparatus of the type comprising a metallic conical rotor rotatably driven and fed at its center with a liquid to be distilled, a vacuum bell defining an enclosure housing the cone and means for inductively heating the rotor which are located beneath and in proximity to the latter, wherein the heating means comprise at least two concentric inductors supplying different thermal power densities to homologous regions of the rotor and wherein an inner inductor supplies a greater thermal power density to the rotor than the power density supplied to the rotor by an outer inductor.

According to another aspect of the invention, in order to be able to dispose the conductors of the inductors in very close proximity to the rotor, without this resulting in an excessive heat-up of these conductors by radiation from the rotor, there is proposed a molecular distillation apparatus of the type comprising a metallic conical rotor rotatably driven and fed at its center with a liquid to be distilled, a vacuum bell defining an enclosure housing the cone and means for inductively heating the rotor which are located beneath and in proximity to the latter, wherein the heating means comprise at least one inductor supplying different thermal power densities to homologous regions of the rotor, and wherein the inductor or inductors are provided with cooling means and are located at a distance from the rotor which does not exceed approximately 5 mm.

According to yet another aspect of the present invention, there is proposed a process for manufacturing an assembly of a conical rotor and inductors for a molecular distillation apparatus such as defined hereinabove, the inductors being constituted by metallic tubes capable of being shaped, which comprises steps consisting in:

molding a thin layer of reinforced plastic of essentially uniform thickness over the lower surface of the rotor, separating said layer from the rotor after curing, shaping the inductors by using said thin layer as a template against which the tubes are closely applied, molding over the tubes, positioned on said thin layer, with a second layer of plastic covering the inductors and binding to said layer of reinforced plastic and, fixing the assembly thus obtained beneath the rotor.

Figure 3:
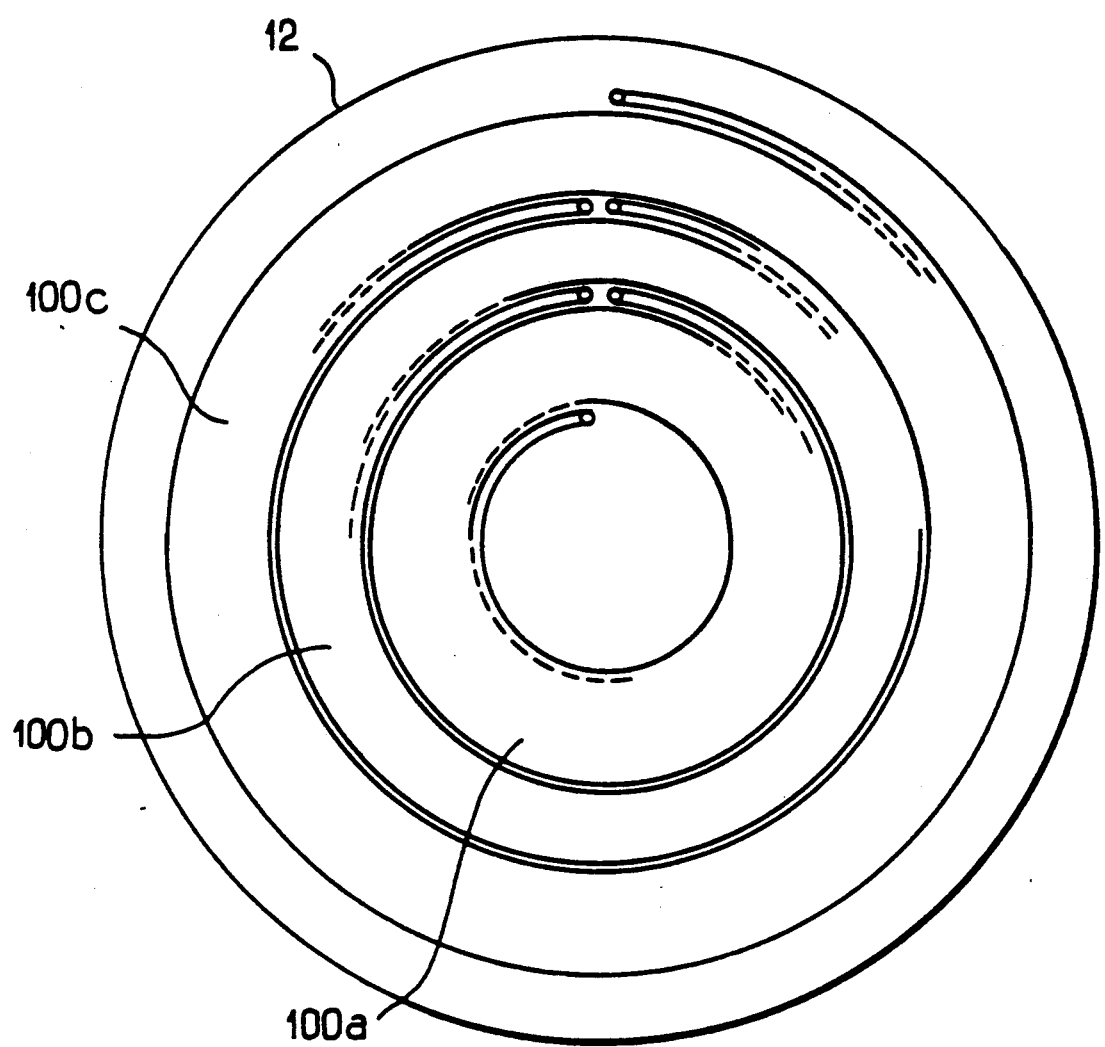
Figure 6:
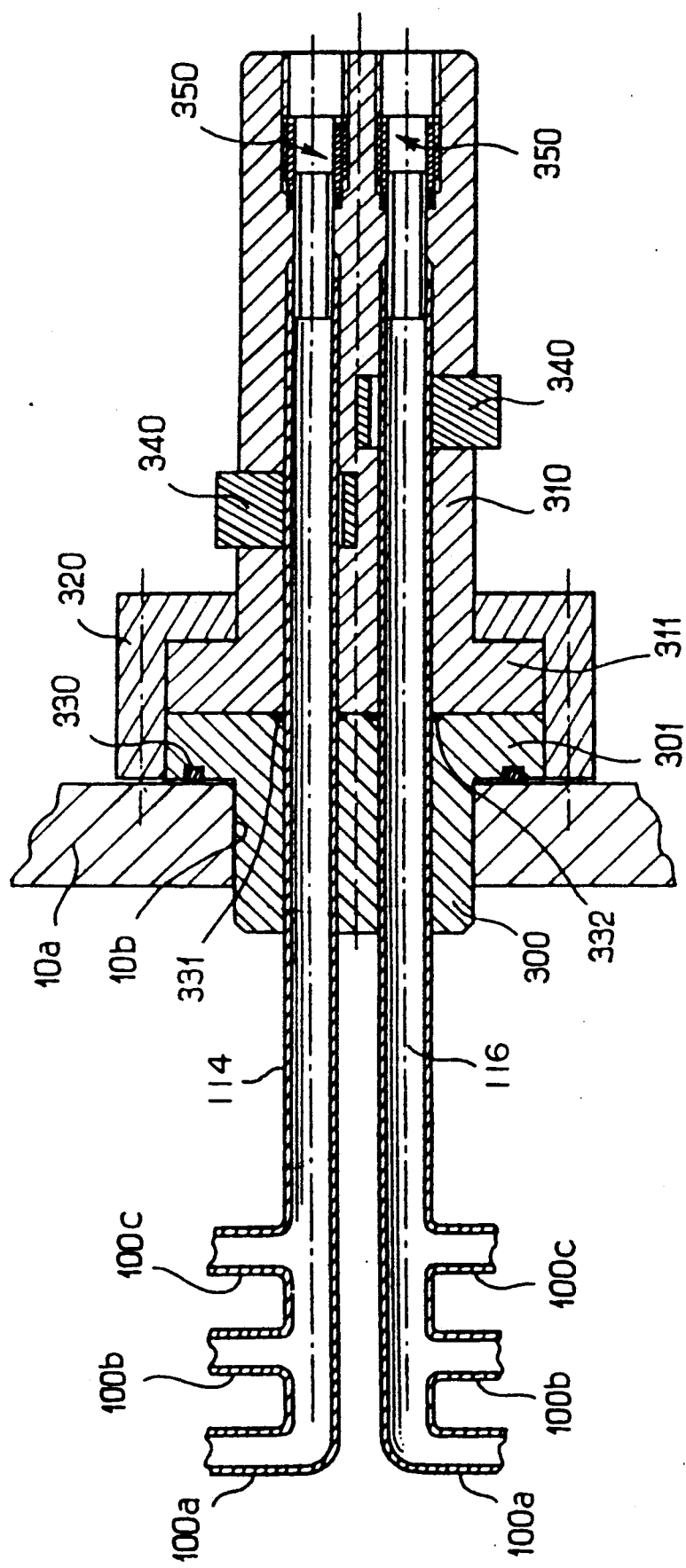

Other aspects, objectives and advantages of the present invention will become clearer on reading the following detailed description of a preferred embodiment of the latter, given by way of non-limiting example and with reference to the attached drawings, in which:

FIG. 1 is a diagrammatic overall view of a molecular distillation apparatus constructed in accordance with the present invention, FIG. 2 is a view, in axial cross section, of a portion of the apparatus of FIG. 1, FIG. 3 is a plan view, from below, of the portion of FIG. 2, FIG. 4 is a partial electrical circuit diagram of the induction-heating device of the apparatus of FIG. 1, FIG. 5 combines a view in axial cross section and a graph showing a heating characteristic of the apparatus, FIG. 6 is a view, in axial cross section, of a wall feed-through construction used in the apparatus of the invention and FIGS. 7a to 7d illustrate the steps of a process for producing a portion of the apparatus of FIGS. 1 to 3.

It will be noted at the outset that, from one figure to another, identical or similar elements or portions have been designated by the same reference symbols.

Referring first of all to FIG. 1, there is shown a molecular distillation apparatus which comprises a vacuum bell 10 fixed to a baseplate 10a and in which an appropriate vacuum is established by a vacuum pump (not illustrated). A conical rotor 12 is mounted on the output shaft of a gear motor 14 located outside the bell. The rotor 12 is fed at its center via a pipe 16 traversing for example the baseplate 10a of the jar and fed outside the latter with product to be distilled. A metering pump 18 provided in the pipe 16 enables the liquid to be distilled to be fed to the center of the cone 12 with a constant flow rate which can be adjusted as a function of the product to be treated. The cone 12 is metallic and heated by an induction-heating device, described hereinbelow, in order to cause controlled evaporation of a volatile fraction of the liquid. The baseplate 10a comprises outlet passages 20 and 22, respectively in order to collect the fraction evaporated and then condensed on the bell and in order to collect the fraction which has not evaporated and which escapes, under the effect of the centrifugal force at the periphery of the cone, into an appropriate channel 24.

These means, with the exception of the heating device, are conventional and will not be described in more detail.

The heating device comprises a plurality of inductors (as detailed later), diagrammatically indicated by 100, spirally wound beneath the rotor 12. These inductors are supplied by a generator 102 connected to mains voltage 104, via a transformer 106 and a capacitor 108. Preferably, the frequency of the delivered induction current is between, for example, 1 and 30 kHz, preferably between 5 and 25 kHz. The inductors are made in the form of hollow metallic tubes, for example copper tubes, cooled by a cooling circuit using a liquid (such as water) comprising pipes 110 and an exchanger 112. This circuit 110, 112 may also be used for cooling the transformer 106, as illustrated.

It should be noted here that the use of cooled tubes for the inductors will, according to a beneficial aspect of the present invention, enable the inductors to be disposed in close proximity to the rotor so as to optimize the efficiency of the inductive coupling. More precisely, by virtue of this cooling, the significant heat radiated by the rotor in the direction of the inductors does not induce an excessive heat-up of the latter.

Such a characteristic enables, in particular, the thermal power provided to the rotor to be increased by increasing the current in the inductors. It will be noted that this advantageous characteristic of the cooling is also applicable to the case where a single inductor is provided.

Specifically, the distance between the inductor or inductors and the rotor advantageously does not exceed approximately 5 mm, and is preferably between 1 and 3 mm and even more preferably close to 2 mm.

According to an essential aspect of the present invention, so as to apply to the rotor a thermal power density having a profile, in the radial direction, well suited to the treatment, at least two concentric inductors are used, each of which is made by conical spiral winding of a metallic tube.

The object of such a disposition of inductors is, in particular, to apply to the cone 12 a thermal power density which is greater in the region of the center and which is lower in the region of the edges, in relation to an average value, so as to overcome the drawbacks of the single inductor device discussed in the introduction. It has been observed that this result could be obtained by supplying the two (or more) inductors in parallel by means of the same generator. Typically, the device of the invention having several concentric inductors, by a judicious choice of the position and the dimensions of the ring in which each inductor is inscribed and of the number of turns of each inductor, enables a very wide range of power density profiles to be obtained along a radius of the rotor.

There will now be described by reference to FIGS. 2 and 3 a preferred disposition of inductors. The conical rotor 12 and three concentric inductors, namely an inner inductor 100a, an intermediate inductor 100b and an outer inductor 100c, are shown therein. The intermediate inductor enables the power density to be decreased uniformly and with a gentle slope between the region close to the center of the rotor and the region of its edges.

In this example, the rotor 12 is preferably made of stainless steel, or even of a composite material composed of an upper layer of food-grade stainless steel (liquid side), for example type 316, of an intermediate layer of aluminum and of a lower layer of magnetic stainless steel. Such a composite is known in particular by the commercial designation "Duranell" (registered trademark). Such a composite material is advantageous because it enables a good inductive coupling to be obtained, although it has to incorporate a food-grade steel (type 316) whose magnetic properties as such would be inappropriate. More precisely, the lower layer of magnetic steel ensures an efficient coupling with the inductors, while the thermal conductivity properties of the intermediate layer of aluminum ensure the transfer to the upper layer the heat inductively generated in the lower layer.

As a variant, it is possible to use for the rotor a composite material comprising a central layer made of mild steel and two outer layers made of magnetic steel, of food grade if conditions demand it. It is possible especially to use the composite known by the name "Triplam" (registered trademark).

The rotor preferably has a thickness of the order of 5 mm.

Each inductor is disposed beneath the conical surface of the rotor 12 with a sufficiently small clearance, typically 2 mm or less, in order to obtain a high heating efficiency.

In the present example, each inductor is made from a copper tube of 10 mm outer diameter and 1 mm wall thickness. The turns of each inductor have, in this case, a constant pitch of the order of 14 mm.

Shown in FIG. 4 is the equivalent electrical circuit diagram, showing the parallel connection of the three inductors 100a, 100b and 100c to the same generator 102, 106, 108.

Specifically, an induction-heating device has been designed for a rotor made of food-grade stainless steel of 5 mm thickness and 90 cm diameter. The zone in which heating was to be applied was a ring of 66 mm inner radius and 417 mm outer radius. The total power which was to be applied to the cone was approximately 50 kW. Furthermore, the ratio between the power densities in the inner region of the ring and in its outer region was to be of the order of 5 to 6. The frequency of the supply current of the inductors was 27 kHz.

Indication will be given hereinbelow of the characteristics of each inductor of the heating device meeting these criteria:

| Inductor | N | D1 | D2 | V | I | P | D |
|---|---|---|---|---|---|---|---|
| Inner | 9 | 66 | 183 | 450 | 250 | 18.25 | 19.94 |
| Intermediate | 6 | 183 | 300 | 450 | 290 | 21.24 | 11.96 |
| Outer | 7 | 300 | 417 | 450 | 145 | 10.51 | 3.99 | where

N is the number of turns;

D1 is the inner radius of the ring containing the inductor, in millimeters;

D2 is the outer radius of the ring containing the inductor, in millimeters;

V is the supply voltage, in volts;

I is the current in the inductor, in amps;

P is the total power delivered by the inductor, in kilowatts;

D is the surface power density (theoretical), in $W/cm^2$.

In this case, it is observed that the theoretical ratio between the power density provided by the inner inductor and that supplied by the outer inductor is approximately 5.

In FIG. 5 is shown the power density profile obtained specifically along a radius of the cone. More precisely, 6 thermocouples were placed at uniform intervals along the radius and the rate of temperature rise of the inner surface of the cone (in ° C. per second) was measured each time, from the moment the induction-heating is started, this rate being directly proportional to the power density effectively applied; the curve 200 shows diagrammatically the variation in the power density as a function of the radius r taken along the cone (abscissa).

In practice, because of various edge effects and the thermal conductivity of the material of the rotor 12, there is observed not three distinct steps corresponding to the power densities provided respectively by the three inductors (theoretical situation), but a more gradual variation distinguished by a relatively rapid increase in power density from the cold central zone approximately to the middle of the inner inductor 100a (curve portion 201) and then a gradual and slower decrease of this density up to the outer limit of the outer inductor 100c (curve portion 202). This gentler slope is obtained by virtue of the incorporation of the intermediate inductor which delivers, per se, a power density intermediate between those of the inner and outer inductors. Moreover, the ratio between the maximum power density (at the break in the slope between the curve portions 201 and 202) and the minimum power density (at the outer limit of the outer inductor 100c) is of the order of 6.3. This profile has been proven, in practice, to be completely suitable for the majority of molecular distillation operations currently carried out, whether in the pharmaceutical, cosmetic, perfume or farm-produce industries.

It will be noted here that the use of induction-heating of the rotor, together with the obtaining of a variable power density profile as mentioned hereinabove, enables a greater thermal power to be supplied to the liquid to be distilled than that which could be obtained in the prior technique with resistance heating, without inducing excessive heat-up of said liquid. Specifically, it is possible to obtain a flow rate approximately 50% greater than the flow rates conventionally obtained.

FIG. 6 illustrates in detail an example of a connection of the three inductors 100a, 100b, 100c with the outside of the bell. These three inductors are connected, for example by welding, to two collectors 114, 116, for example in the form of larger diameter copper tubes, inside the vacuum bell in order thereby to ensure their parallel supply with current and with cooling water. These collectors 114, 116 traverse the baseplate or rear wall 10a of the vacuum bell 10.

For this purpose, there is formed in the wall 10a an opening 10b into which is engaged a part 300 forming a plug, made for example of polytetrafluorethylene, traversed by two bore holes which receive, snugly and parallel to each other, the two ends of the collectors 114, 116. The plug 300 comprises, at its end opposite the inside of the enclosure, a flange 301 against which bears a similar flange 311 of a fluid and electrical connection body indicated overall by 310 and also made from polytetrafluoroethylene. A clamping collar 320, made for example of aluminum, may be fixed to the wall 10a by screws (not shown) and grips tightly together, and against said wall, the two flanges 301 and 311. O-ring seals 330, 331 and 332 establish, on clamping, the sealing required between the various parts.

The references 340 designate two connection dees made of copper intended for applying the electrical energy to the two ends of the inductor by way of suitable cables coming from the generator.

Finally, at 350 are indicated two connections for the system for circulating cold water in the inductors 100a, 100b and 100c for the purposes of cooling.

It may be noted here that the fact of causing the ends of the tubes 110, 112 to pass in close proximity to each other through the feed-through of the wall of the enclosure minimizes the magnetic field in this region given that these tube sections are traversed by two currents which are identical but the reverse of each other. This minimizes, in its turn, the heat-up of the metallic portions which are in this region.

As a variant, in order completely to eliminate this field in the region of the wall feed-through, it is possible to envisage the two tubes being concentric at this location.

Although not up until now described in detail, the inductors of the apparatus of the present invention are insulated from the environment of the vacuum bell. Thus vapors generated during the distillation process are prevented from coming into contact with the tubes, which could cause either corrosion and deterioration of the latter or even contamination of said vapors and deterioration of the products separated as explained hereinabove.

In a basic embodiment, it is possible to sheath the inductors with a coating of an appropriate plastic.

But according to a particularly advantageous alternative embodiment, it is possible to make coated inductors in the manner which will be described hereinbelow with reference to FIGS. 7a to 7d.

It will be recalled first of all that, in order to give the induction-heating device a satisfactory efficiency, it is imperative that the inductors are as close as possible to the lower surface of the distillation cone without, however, running the risk of impeding or slowing down the rotation of said cone.

According to the preferred process, a template is first of all made by using the cone 12 as a mold element. More precisely (FIG. 7a), with the cone upside down, a thin layer 120 of resin, reinforced for example with glass fibers, is poured over the outer face of the cone. In practice, the thickness of this layer is chosen to be equal to or preferably substantially less than the distance between the inductor tubes and the cone which it is wished finally to obtain. Specifically, this thickness may be 1 mm.

This rigid layer of constant thickness is then separated from the cone and used as a template for the positioning of the inductor tubes, as illustrated in FIG. 7b. More precisely, it is ensured that each tube, when it is bent into the form of a conical spiral in order to give the inductor its shape, remains permanently in contact with the template.

Once the inductors (in this case three in number) are made and appropriately held in place, a thicker layer 122 of resin which may if necessary be reinforced is then poured over the assembly constituted by the template 120 and the tubes 100a, 100b, 100c (FIG. 7c). The thickness of this second layer 122 is chosen to be substantially greater than the outer diameter of the tubes, and for example 20 to 30 mm, in such a manner that said tubes are completely immersed therein and firmly held in place after solidification. As illustrated, fixing tabs 124 may be anchored into this second layer.

This completed assembly may then be fixed in an appropriate position beneath the rotor 12 with the aid of the tabs 124, in such a manner that there remains between said assembly and the rotor as small a space as possible, without however slowing down or impeding the rotation of the latter (FIG. 7d). Thus an assembly of a rotor and inductors is made in which the distance between the lower face of the rotor and the inductors is as small and as uniform as possible, in order thereby to optimize the efficiency of the induction-heating of the rotor.

The portion of the inductor tubes not coated during the molding operations, especially between the actual inductors and the wall feed-through described hereinabove with reference to FIG. 6, may be sheathed with an appropriate plastic such as a resin.

Of course, the present invention is not in any way limited to the embodiment described hereinabove and represented by the drawings, but a person skilled in the art will be able to provide any variant or modification within its scope. In particular, the specialist will be able to adapt the concepts of the invention to rotors of any materials and dimensions and, furthermore, to diverse distillation conditions.

Moreover, although it has been indicated hereinabove that the pitch of the turns of each inductor was constant, this pitch may, of course, be variable, which makes it possible to adjust more finely if necessary the radial power density profile, including the case of a single inductor.

We claim:

1. A molecular distillation apparatus of the type comprising a metallic conical rotor having a center, means for rotatably driving said conical rotor, means to feed a liquid to be distilled to said center of said conical rotor, a vacuum bell, means for establishing a vacuum in said vacuum bell, said vacuum bell defining an enclosure, said enclosure housing the conical rotor and means for inductively heating said conical rotor, said inductive heating means being located beneath and in proximity to said conical rotor, wherein said heating means comprise at least two concentric inductors supplying different thermal power densities to homologous regions of said conical rotor and wherein an inner inductor supplies a greater thermal power density to said conical rotor than the power density supplied to said conical rotor by an outer inductor.

2. The apparatus as claimed in claim 1, including a third concentric inductor defining with said two concentric inductors, outer, intermediate and inner inductors, said intermediate inductor supplying a power density intermediate between the power densities supplied by the inner and outer inductors, said inductors being spirally wound into a number of turns.

3. The apparatus as claimed in claim 2, wherein said three inductors have similar numbers of turns.

4. The apparatus as claimed in claim 1, including an alternating current generator to supply current to said inductors in parallel.

5. The apparatus as claimed in claim 1, wherein the ratio between the power density applied to said conical rotor by the inner inductor and the power density applied by the outer inductor is of the order of 5 to 6.

6. The apparatus as claimed in claim 1, wherein at least one inductor is spirally wound and has a variable pitch.

7. The apparatus as claimed in claim 1, wherein said conical rotor is made from a composite material comprising an upper layer made of food-grade stainless steel, an intermediate layer made of a metal endowed with a high thermal conductivity and a lower layer made of magnetic stainless steel.

8. A molecular distillation apparatus, comprising a metallic conical rotor having a center, liquid feeding means for feeding a liquid to be distilled to the center of said conical rotor, driving means for rotatably driving said conical rotor, a vacuum bell defining an enclosure, said enclosure housing said conical rotor and inductive heating and cooling means located beneath and in proximity to said conical rotor for inductively heating the conical rotor and cooling said inductive heating means, said inductive heating means supplying different thermal power densities to homologous regions of said conical rotor and including at least a first spirally wound hollow metallic tube concentric with said conical rotor which first spirally wound hollow metallic tube is located at a distance from said conical rotor which does not exceed approximately 5 mm, said cooling means comprising liquid supply means for supplying cooling liquid into said at least first spirally wound hollow metallic tube.

9. The apparatus as claimed in claim 8, wherein the inductor is located at a distance from the rotor of between approximately 1 and 3 mm.

10. The apparatus as claimed in claim 8, including at least a second inductor concentric with said first inductor and wherein said liquid supply means supplies cooling liquid to said first and second inductors in parallel.

* * * * *